2 Sheets--Sheet 1.

J. M. WHITING.

Machines for Shaving and Nicking the Heads of Wood-Screws.

No. 5,819.

Reissued March 31, 1874.

Witnesses:
O. L. Bosworth.
J. B. Grinnell.

James M. Whiting
American Screw Co.
assignee
per B. P. Shurtleff

J. M. WHITING.
Machines for Shaving and Nicking the Heads of Wood-Screws.
No. 5,819. Reissued March 31, 1874.
Fig. 3.
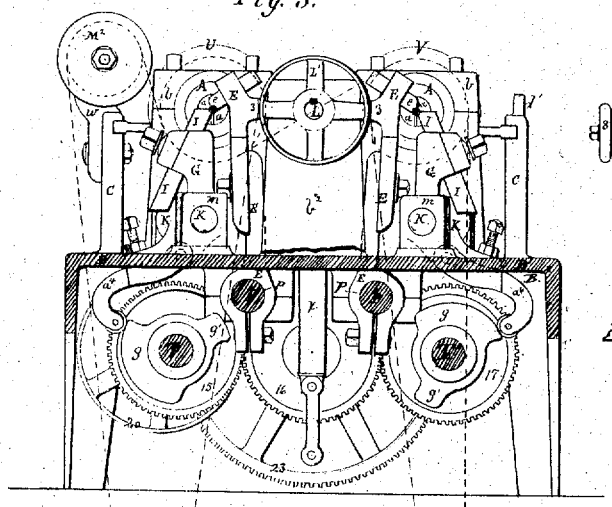
Fig. 4.
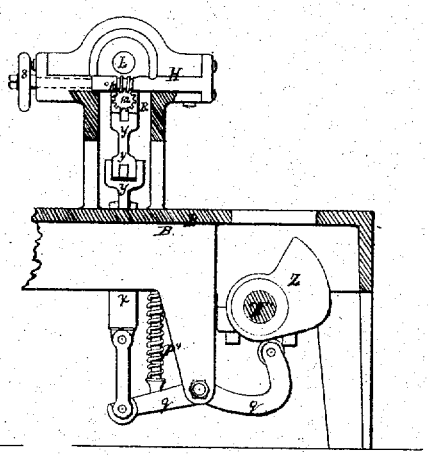
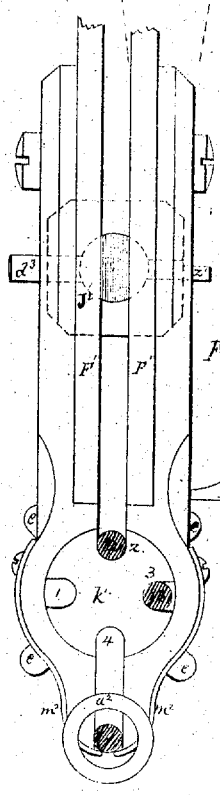
Fig. 10.
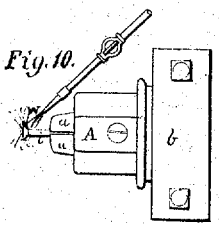
Fig. 5.
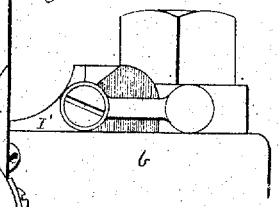
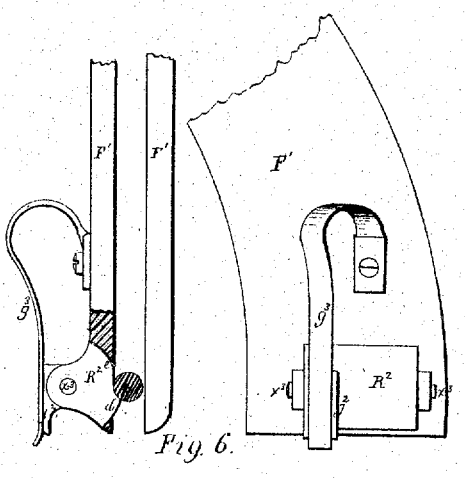
Fig. 6.
Fig. 8.
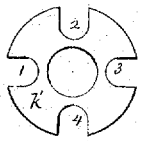
Fig. 9.
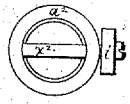
Fig. 11
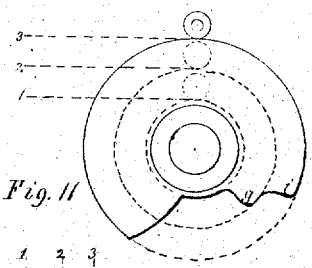
Fig. 7
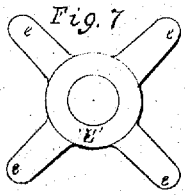
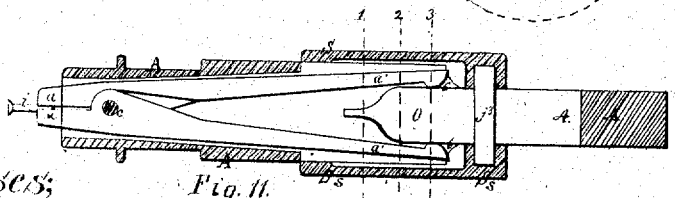
Fig. 11.
Witnesses;
C. L. Bosworth.
J. B. Gimmell.
James M. Whiting
American Screw Co
Assignee
B. F. Thurston Atty

UNITED STATES PATENT OFFICE.

JAMES M. WHITING, OF PROVIDENCE, RHODE ISLAND, ASSIGNOR, BY MESNE ASSIGNMENTS, TO THE AMERICAN SCREW COMPANY.

IMPROVEMENT IN MACHINES FOR SHAVING AND NICKING THE HEADS OF WOOD-SCREWS.

Specification forming part of Letters Patent No. 35,906, dated July 15, 1862; reissue No. 5,819, dated March 31, 1874; application filed November 18, 1873.

*To all whom it may concern:*

Be it known that JAMES M. WHITING, of the city and county of Providence and State of Rhode Island, did invent certain new and useful Improvements in Machines for Shaving, Nicking, and Burring the Heads of Wood-Screws; and that the following is a full, clear, and exact description of the same, reference being had to the accompanying drawings, making part of this specification, in which—

Figure 1:
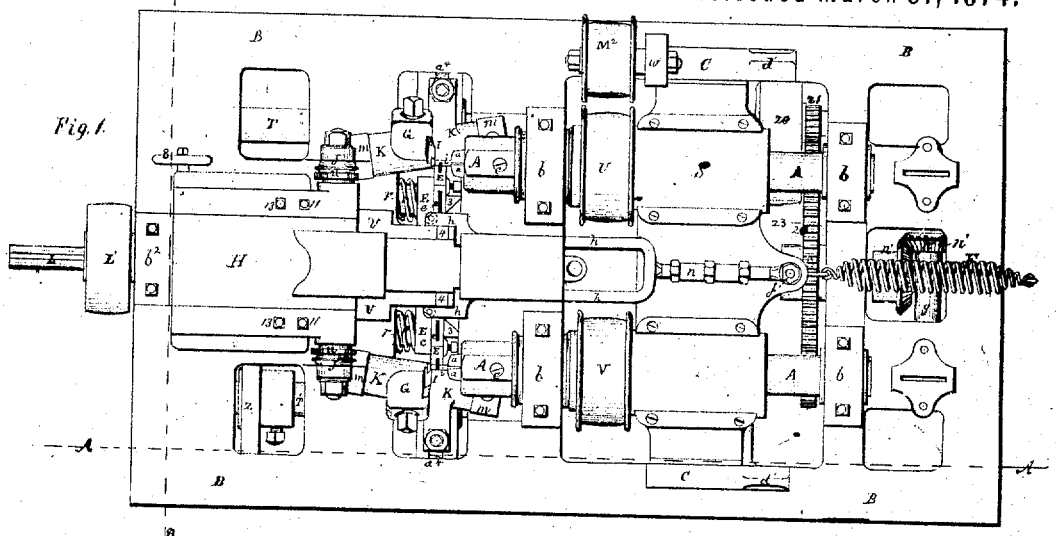
Figure 2:
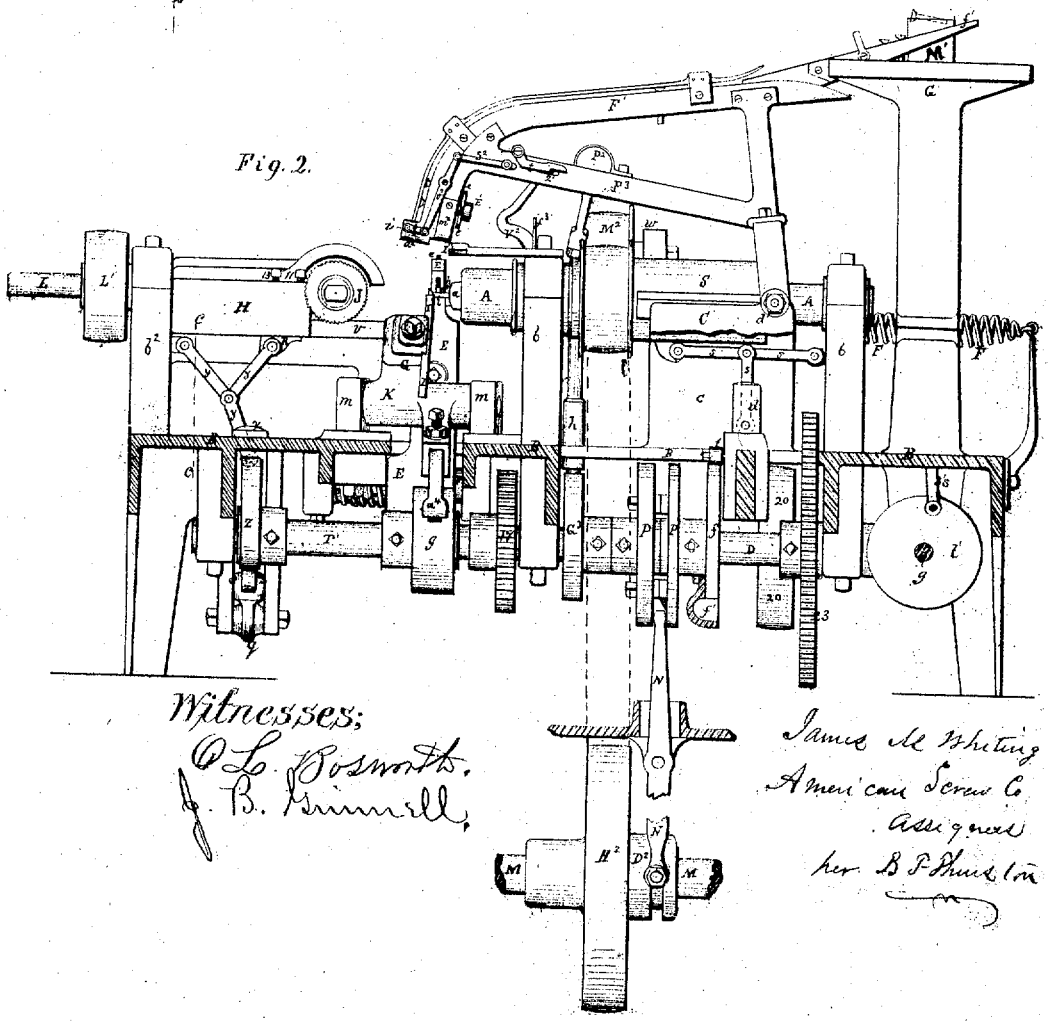

Figure 1 is a plan of the said improved machine. Fig. 2 is a side elevation and section by the line A A of Fig. 1. Fig. 3 is an end elevation and section through the line B B of Fig. 1, with the nicking apparatus removed to give an unobstructed view of the other parts of the machine. Fig. 4 is an end elevation and section by the line *c c* of Fig. 2, showing the nicking apparatus by itself. Fig. 5 is a full-size front view of a portion of the apparatus for feeding screw-blanks to the machine, which is more fully explained in the description. Fig. 6 is a front and side elevation of another device for the same purpose as that of Fig. 5. Figs. 7, 8, and 9 are details of Fig. 5. Fig. 10 is a plan of the jaws of the nippers which hold and revolve the said blanks, and the device employed to remove the blanks therefrom after the operation is completed. Fig. 11 is a view of the said nippers, and the cam which opens and closes the same at the proper time, which are fully explained in the description.

Similar letters indicate corresponding parts in all the figures.

The machine represented in the drawings is double, and is capable of operating with like effect on two screw-blanks at the same time, which mode of construction has been adopted for the purpose of economizing the space occupied by it, and also the cost of construction, as the same mechanical movements that operate one set of devices can also operate the other to a considerable extent. But in describing the mode of operation embodied by this mechanism, each set of devices may be regarded as a separate machine, which performs all it operations upon the screw-blank independently of the other.

The said invention relates, in the first place, to the combination and arrangement of the mechanical devices which constitute the machine, by the operations of which the several operations of shaving the head of the screw-blank, nicking the same, and reshaving the head to remove the burr left by the nicking-saw, are all automatically performed upon the blank.

In machines heretofore used for shaving the heads of screw-blanks, the blanks were received and held in the griping-jaws of a revolving mandrel, and a shaving-tool, with a V shaped cutting edge suitably held, was moved up to the revolving blank, which reduced the head to the desired form, the blank being sustained during the operation of shaving by a rest, which, when the operation was completed, moved out of the way to permit the finished blank to be discharged from the jaws of the mandrel and another to be inserted. This same mode of operation is also employed in my machine, and is the foundation upon which my improvements rest.

This invention therefore consists, first, in independently connecting the nipper-mandrel with the shaft from which the other portions of the machine are driven, and in controlling the connecting mechanism by means of a shipper and clutch automatically actuated, intermittently, by a continuously-operating portion of the machine, whereby said mandrel will be made at proper intervals to revolve and to rest, for the purpose of subjecting the head of a blank, when held by the nippers, to the alternate action of a shaving-tool and a nicking-saw.

Second, in mounting a portion of the chute or railway for conducting the blanks from the hopper to the nippers on a pivoted frame, whereby the delivery end of said chute or railway may be automatically moved to and from the jaws of the nippers, and in combining the same with actuating mechanism, whereby said movements may be effected.

Third, in combining with the lower or delivery end of the oscillating railway or chute a pusher, operated automatically, when at its lowest point, in a line with the axis of the nipper-mandrel, whereby, at the proper moment, the blank will be driven longitudinally into the jaws of the nippers.

Fourth, in combining with the blank-conducting chute or railway a separator, whereby the foremost blank will be separated from the next in line, and presented for delivery to the nipper-mandrel.

Fifth, in combining with the delivery end of the blank-conducting railway a spring-pusher, mounted on the pivoted chute or railway, and in arranging the same so that the spring-pusher will be automatically and intermittently operated by the movement of the chute or conducting-railway.

Sixth, in controlling and operating the clamping devices of the nipper-mandrel by means of a toggle joint, intermittently actuated by a rotating portion of the machine.

Seventh, in operating the wedge-faced bar, which controls the blank-rest, by means of a toggle-joint, actuated by a rotating portion of the machine.

Eighth, in operating the saw-carriage to and from the heads of the blanks, when held by the nippers, by means of a toggle-joint, and combining therewith a means of adjustment, whereby the depth of the cut to form the slot or nick in the head of the blank may be accurately determined.

Ninth, in combining with the saw-carriage and the main saw-driving shaft a driving-pulley, provided with a hub and collar, fitted to bearings in a stationary portion of the frame of the machine, and having an eye in said pulley, through which the saw-driving shaft is free to move longitudinally while being rotated by and with said pulley.

Tenth, in combining with the nippers and shaving-tools a jet-pipe, for so discharging a jet of water, under pressure, that the water may not only serve to secure a smooth and polished surface on the head of the blank, as heretofore employed, but also to perform the function of a releaser in driving the blank from the nippers after their gripe has ceased thereon.

In Figure 1 of the annexed drawings, A A are the two spindles or mandrels, arranged parallel to each other upon a horizontal bed-piece, B, of cast-iron, and revolving in suitable bearings formed in the stands *b b b b* upon said bed-plate, as shown. The blanks *i i* are held in the jaws *a a* of the nippers in the end of the spindle, while the successive operations are being performed upon the heads of the same. These jaws are united in a hinge-joint, at *c*, each having a tail-piece or shank, $a^1$ $a^1$, which extends toward the opposite end of the spindle in a slot formed therein for their reception, as seen in Fig. 11. The said jaws are made to close and seize one end of the blanks *i*, when properly presented thereto, by means of a wedge, O, Fig. 11, which slides between and forces the tail-pieces $a^1$ $a^1$ of the jaws asunder, and the said jaws are opened to release the blank *i*, when the operation is completed, preparatory to receiving another blank, by withdrawing the said wedge from between the tail-pieces, thereby permitting their return to their former position by the force of a spring, suitably arranged for the purpose. The said wedge is inclosed within, and operated by, the sliding sleeves S S acting upon the collar $J^3$, which revolves in a recess formed in the interior of said sleeves, Fig. 11. The sleeves embrace the spindles, and are united by a web which has a bearing upon each side of the machine in suitable guides formed in the stands C C.

This construction and arrangement of the jaws *a a*, and the means described for operating the same, (including the wedge and sliding sleeve,) it should be understood, have been previously employed for the purpose, and are not to be considered a part of the invention herein claimed.

The sleeves S S are made to slide, to perform their specific functions, by means of the toggle-joint *s s s*, the vertically-sliding plunger *d*, and the cam *f* upon the shaft D, Fig. 2, acting against the force of the spiral spring F.

It is apparent that the sliding movement of the sleeves produced by the toggle-joint, operated as shown, or in a similar manner, is positive, and that it has the peculiarity of closing the jaws quickly and acting most forcibly when the movement is nearly completed—that is, when the blank is seized by the jaws—and, further, that, in connection with the wedge O, it maintains this forcible gripe without any effort on the part of the cam *f* to keep it in its position, and without any strain upon the spindle; and it is this peculiarity of the toggle-joint in such connection which makes it the most suitable means for the purpose that has been hitherto used, and this employment of the toggle-joint to effect the sliding of the sleeve forms one of the features of improvement in this machine. This toggle-joint serves a two-fold purpose, as will presently appear.

The blanks *i i* are supported near the head, while the successive operations are being performed, by the back-rests *e e* in the rocker-arms E E upon the shafts *p p*. They are of the form shown in the drawing, and each one is placed obliquely above the axis of the mandrel on the side opposite to the shaving-tool, and each one is provided with a notch or recess to receive the blank, as shown. By this form and position of the rest it affords an efficient support to the blank under the operations of both shaving and nicking. The rests are pushed up against the body of the blank, against the action of a spring, *r r*, encircling the shafts *p p* at the proper time by means of the square sliding bars or chocks *h h*, which are provided with a roller in the end, which rolls against the inclined surface of the projection 3 of the rocker-arms, Figs. 1 and 3, by the sliding movement of the said bars, and thereby facilitates the carrying of the rest up to the blank, and the introduction of the bar or chock between the projection 3 and the fixed post 4 4 upon the frame or bed-piece B, to afford an unyielding and solid support to the rest after it has attained its position, as much so as if the rest were a part of the fixed post itself, this result being particularly desirable for the purpose.

The sliding bars or chocks *h h*, it will be seen, (Fig. 1,) are formed in one piece, and are attached to the web of the sleeves S S by the connection *n* and stud *j*, the eye in said connection being somewhat elongated to provide for any slight difference in the time of movement of the said bars, and the sleeves S S both being operated by the same mechanism, viz., the toggle-joint *s s*, the plunger *d*, and the cam *f*, and it is in this respect that the said mechanism serves a two-fold purpose, as before remarked, which, as it dispenses with a separate mechanism and an independent operation, is especially desirable and useful, and forms another feature of improvement.

That the nature and propriety of this joint movement of the sleeves which operate the jaws *a a* of the nippers, with the sliding bars or chocks *h h* which operate the rests *e e* from one source of motion, (the cam *f*,) may be fully understood, I will further explain, by reference to Fig. 11, that the first swelling *g* of the cam *f* forces the wedge O between the tail-pieces *a a* of the nippers, and gripes the blank, the end of each tail-piece resting upon the plane surface 6 6, following the incline of the wedge, at the same time partially sliding the bars *h h*, and afterward completing the latter movement by means of the second swelling *i* of the cam *f*, which also slides the plane surface 6 6 between the tail-pieces without, however, moving the latter or in any way affecting the nippers. Thus, by means of the two swellings *g* and *i* of the cam, and the plane surface 6 6 upon the wedge O, the two devices are operated in conjunction from one source of motion.

The heads of the blanks *i i* are shaved to the proper size by means of the shaving-tools I I in the rocking tool-posts G G upon the shafts K K, the said tools being formed with a V cutting-edge, as shown, to cut upon both sides of the head at the same time; and these tools are inclined sufficiently from a perpendicular position to present the tools to the head in the required relative position to make them cut.

The shafts K K turn in bearings formed in the stands *m m*, and the tool I is moved up to shave the head of the blank, against the force of a spiral spring inclosed in the shaft K, or a similar resistance, by means of the cams *g g* upon the shafts T T′, acting through the medium of the hinged tail-pieces $a^4$ $a^4$ extending from the shafts K K, Figs. 2 and 3; and the position of the tool-posts, relatively with tail-pieces, is determined by means of the adjusting set-screws therein shown.

The nick is cut in the head of the blank, after the shaving operation is completed, by means of the circular saws J J—one for each spindle or mandrel—which are revolved by means of bevel-gears, which connect the saw-shaft with the shaft L, the latter being revolved by the pulley L′, which is driven by a belt from a pulley on the main driving-shaft of the machine, as indicated by dotted lines in Fig. 3. The saws are revolved so that the direction of their cutting action is upward or toward the rests *e e*, which sustain the blanks against the action of the saws as well as the action of the shaving-tool. The saws are mounted upon a carriage, H, formed as shown in Figs. 1, 2, and 4, which has a sliding movement upon suitable ways *v v* extending from the stand $b^2$, which forms a bearing for the hub or sleeve of the driving-pulley L′ to the stands *b b*, and forms part of the bed-piece of the machine. The sliding movement which causes the saws to approach the head of the blank to cut the nick, and to recede after the operation is performed, is produced by the toggle-joint *y y y*, the plunger *x*, the lever *q*, and cam *z* upon the shaft T′, Figs. 2 and 4, against the spring $P^4$.

It will be seen that the carriage H, Figs. 1 and 2, is necessarily removed at some distance from the head of the blank while the other operations are being performed to avoid interference therewith; and that it is desirable to bring the same up quickly to the head at the appointed time, and to move only as fast as the saws cut after they come in contact with the head of the blank to be nicked; also, that the approaching movement be positive, that the nick may be cut exactly in the center of the head, and to prevent the saws from chattering. For producing this movement, the toggle-joint, arranged and operated as described, is exactly suited, and its use for the purpose forms another feature of improvement in this machine.

In the use of the toggle-joint for the above purpose, the depth of the notch or nick which the saws shall cut is determined by moving the joint-piece R upon the carriage toward or from the similar joint-piece upon the stand $b^2$. This is done by means of the hand-wheel 8, Figs. 1 and 4, the worm 10, and the worm-wheel 12, Fig. 4, the latter operating a screw, which passes through the joint-piece R, and thus slides and fixes the latter in position by simply turning the hand-wheel 8. The saws are adjusted upon the screw-shaft so as to cut in the center of the head by means of the screw-nuts or sleeves *u u*, and to their proper position vertically by means of the set-screw 11, the set-screw 13 serving to hold the saws in such position. The shaft L, which drives the saw, slides horizontally and parallel with the movement of the carriage H in the hub of the driving-pulley L′, said pulley being provided with a long hub or sleeve, with a collar formed thereon outside the bearing, to keep it in its place, regardless of the movements of the carriage and the shaft L. The burr formed upon the head of the blank by the nicking operation is removed by a second approach of the same tool which shaved the head, it being moved up to the head for that purpose by means of the smaller cam-faces $g^1$ on the cam $g$. In the performance of the successive operations of shaving, nicking, and burring, the mode of operation is that the spindles or mandrels revolve steadily in one direction until the operation of shaving the head is completed, after which, by simply stopping the spindles from revolving, the saws approach and perform the nicking operation, after which the spindles are again put in motion, and the burring operation is performed by a repetition of the shaving operation, the only change in the condition of the spindles from revolving continually in one direction, and in one position, being that they cease to revolve during the nicking operation. The spindles are stopped, and again started after the nicking operation is completed, by means of a friction-clutch, $D^2$, operated by the shifting-lever N and the cam P upon the shaft D, which disconnects the pulley $H^2$ from the driving-shaft M, and again effects the connection of the same to continue the operation. The spindles are revolved in opposite directions by means of a belt from a pulley, $H^2$, upon the main driving-shaft M of the machine, which passes over the pulley $M^2$, upon a fixed stud projecting from the stand $w$, thence beneath the pulley U, and over the pulley V to the driving-pulley again, as shown by the dotted lines in Fig. 3. The cam-shafts D T T′, beneath the bed-piece B, revolve in bearings formed in the bed-piece, as shown in Figs. 2 and 4. The said shafts are connected in their movements by the three gears 15 16 17, and are driven by the pulley 20, the pinion 21, and the gear 23, upon the shaft D. The shaft D also drives the cross-shaft $g$, by means of the bevel-gears $n'$ $n'$. Upon each end of this cross-shaft is fixed a pitman, $l'$, which reciprocates a vertically-sliding carrier, $M^1$, connected with the said pitman by the shackle-bar $s^1$. The office of the carrier is to select one or more blanks from a mass contained in the blank receptacle or hopper G, in the manner shown in Fig. 2, and transfer the same to the hinged prongs $f^1$ $f^1$ of the inclined railway or conductor $F^1$, in which they are deposited, suspended by the head, and are carried and delivered at the lower end to the griping-jaws $a$ $a$ of the nippers.

As the construction and operation of the blank-receptacle, carrier $M^1$, and the hinged prongs $f^1$ $f^1$, above mentioned, are fully set forth in a separate application for a patent, a more exact description is unnecessary in this.

The inclined railway or conductor $F^1$ is hinged to ears $d^1$ $d^1$ upon the stands $e$ $e$, upon each side of the machine, and there is one railway or conductor to each spindle, both operating simultaneously, the forward or lowermost end descending to deliver a blank to the jaws $a$ $a$ of the nippers, and ascending out of the way while the blank thus delivered is being operated upon, the ascending and descending movements being produced at the proper time by the cam $G^3$, upon the shaft D, acting through the medium of the vertically-sliding rod $h$. In the forward end of the railway $F^1$ is placed a cylinder or separator, $k'$, (Fig. 5,) having four or more recesses formed therein of sufficient capacity to contain the body of one blank only, as shown in Fig. 5. Attached to the cylinder $k'$ is a star-wheel $E^1$, (Fig. 7,) by means of which the said cylinder is revolved with an intermittent movement when the railway ascends, by the arms $e$ $e$ $e$ $e$ of the wheel coming in contact with the click I′, (Figs. 2 and 5,) which turns the separator or cylinder one-fourth ($\frac{1}{4}$) of a revolution, in doing which recess 1 takes the place of recess 2, and receives a blank from the railway; recess 2 takes the place of 3, holding a blank in reserve, as shown in section in Fig. 5, and recess 3 takes the place of recess 4, and deposits its blank on the spring-holders $m^2$ $m^2$, where it is held in the proper position to be thrust into the jaws $a$ $a$ of the nippers. The end of the blank, thus deposited, is thrust into the jaws of the nippers while they are revolving, by means of the pusher $x^2$, extending across the recess or barrel $a^2$ for receiving the head of the blank, as seen in Fig. 9; the link, Fig. 2, the lever $v^2$, the connecting-rod $s^2$, and a sliding piston inclosed in a barrel, $J^2$, Fig. 5, formed in the arm $F^3$ of the railway-frame, the said piston being actuated at the proper time by the spring $P^2$, and the piston is held back against the force of said spring by means of the latch $t$ and the catch $z^1$, Figs. 2 and 5, projecting from the piston outside the barrel. The pusher $x^2$ is drawn back to receive the blank, and afterward to drive it into the jaws $a$ $a$ of the nippers, by means of the finger $V^2$, upon the inclined surface of which the stud $d^3$, Fig. 5, slides by the ascent of the railway, which forces the piston back against the action of the spring $P^2$ until it is caught and held by the latch $t$, as before explained. The sliding piston is released, when, by the descent of the railway $F^1$ with the holder $m^2$ containing the blank next to be operated upon, it arrives at the proper position to be presented to the revolving jaws $a$ $a$, the latch $t$ comes in contact with and is lifted by the end of the fixed post $f^3$, which releases the piston and causes the pin or pusher $x^2$ to drive the end of the blank between the jaws of the nippers, in which position it is held, until seized by said jaws, by means of the flat springs or holders $m^2$ $m^2$, Fig. 5, upon the ends of which the body of the blank rests, as shown, which ends separate and release the blank when it has been seized by the jaws $a$ $a$, by the ascent of the railway.

It will be seen that the blank in the holder $m^2$ is thrust into the jaws $a$ $a$ by the very act of carrying the said blank to the proper position to be presented to said jaws, and it is this peculiarity in the mode of operation which distinguishes it from others in which the blank is thrust into the griping-jaws or their equivalents by a separate mechanism involving an independent mode of operation.

It will be seen that the recessed cylinder $k'$, in revolving as described by the movement of the railway, takes one blank at a time from the column and holds the remaining blanks in reserve; also, that the same movement of the cylinder $k'$, in taking a single blank from the column, also deposits a single blank in the barrel $a^2$ and on the holder $m^2$, to be presented in turn to the nippers, and that the flat springs or holders $m^2$, acting in combination with the cylinder or separator $k'$ upon a column of blanks so arranged in the conductor or railway, serves to deliver the blanks composing such column one by one to the griping-jaws, and when combined with the means above described for thrusting the said blanks into the jaws of the nippers, when delivered and presented thereto, insures a constant supply to the nippers as the operation of shaving and nicking proceeds.

In place of the recessed cylinder $k'$ and the spring-holders $m^2$ $m^2$, arranged and operating as described, for the purpose of presenting the blanks singly to the nippers, the device shown in Fig. 6 may be employed, which consists of a tumbler, $R^2$, upon the pivot $x^3$ in the delivery end of the railway, and upon one side thereof, which is held and returned to the position shown by the force of the spring $g^3$ acting against the post-piece $j^2$ on the tumbler or separator, when the blank $i$ in the position shown is seized by the jaws of the spindle and the railway ascends the projecting portion $d$ of the tumbler, yields and releases the blank at the same time the upper portion of the tumbler comes in contact with the succeeding blank, and prevents it from descending until the tumbler resumes its position, as shown, and supports the column of blanks until another one is to be supplied.

The blank is removed from the jaws of the nipper, after its head is finished by the force of a jet of water directed through jet-pipe $w$ obliquely against the under side of its head upon one side, as shown in Fig. 10, the jet so applied having the effect to destroy the centrifugal force imparted to the blank by the spindle, as well as to push the blank from between the jaws $a$ $a$, by the force with which the jet of water strikes against the under side of the head, the said jet of water also being the means employed to produce a smooth cut and polish on the head of the blank, though its employment for this purpose solely is not new.

The mode of operation of the several parts described is as follows: A sufficient number of blanks having accumulated in the railway or conductor $F^1$, by means of the mechanism shown in Fig. 2, or some other equally effective, the machine is started, when the railway descends, carrying a blank on the spring-holder into line with the mandrel, when, by means of the spring-pusher, it is thrust into the jaws of the nippers, which gripe and hold it firmly, and the railway ascends out of the way, in doing which another blank is deposited by the recessed cylinder or separator $k'$ on the spring-holders $m^2$, to be next delivered to the jaws. Immediately following the seizure of the blank by the nippers the rests $e$ $e$ are brought up to their support in the manner before described, after which the two shaving-tools I I are moved up simultaneously to the two blanks, and the heads shaved smoothly to the required size and form, when the said tools are withdrawn, and at the same time the revolution of the spindle is stopped by the action of the clutch K, after which the two saws are carried up to the heads and the nicks cut therein. This being done, the saws recede out of the way, the spindles are again started, (revolving,) and the shaving-tools are moved up to the head of the blank a second time, to remove the burrs formed by the saws upon each side of the nick, after which the shaving-tools are withdrawn, the jaws of the nippers are opened, and the blanks are released and ejected therefrom by the jets of water that are directed against the rear of the head during the several operations. Another blank being supplied to the griping-jaws, the operation proceeds as before, and thus continues.

Having described the construction and operation of the improved machine, what is claimed as the invention of the said JAMES M. WHITING, is—

1. The combination, with the nipper-mandrel and the driving-shaft, of the connecting mechanism, the clutch, shipper, and cam, substantially as described.

2. The conducting-railway, mounted on a pivoted frame, in combination with a pusher and a nipper-mandrel, whereby the delivery end of the railway may be advanced toward the nipper, deliver a blank thereto, and recede therefrom, substantially as described.

3. The combination, with the nipper-mandrel and the pivoted conducting-railway, of a pusher, mounted upon and operated by the movement of the railway, whereby the lowest blank in the railway will be driven longitudinally toward and into the jaws of the nippers, substantially as described.

4. In combination, with the delivery end of the vibrating railway, a separator, mounted at the foot of the railway, and arranged to be intermittently rotated by the movement of said railway, substantially as described.

5. The combination, with a pivoted railway, of a pusher, mounted upon the delivery end of said railway, and rendered automatic in its operation by means of a spring which actuates said pusher, and by means of devices for compressing the spring and releasing the pusher, and all depending for their operation upon the movement of the railway, substantially as described.

6. The combination, with the nipper-mandrel, of a sliding cam for actuating the nippers, and a toggle-joint, substantially as described.

7. The combination of the vibrating rest-standard, the fixed post, and the sliding wedge-faced bar, with the toggle-joint for actuating said bar, substantially as described.

8. The saw-carriage, in combination with the toggle-joint and an adjusting device, whereby the longitudinal movement of the saw-carriage may be controlled and limited, substantially as described.

9. The combination, with the saw-carriage and the main saw-shaft, of a sleeved driving-pulley, arranged to revolve in bearings fitted to the sleeve, and provided with an eye for receiving the saw-shaft, and a means for engaging therewith during its longitudinal movement, substantially as described.

10. The combination, with the nippers and shaving-tool, of a jet-pipe, set at an angle to the axis of the nipper-mandrel, and arranged for discharging a jet of water under pressure against the blank behind its head when held by the nippers, whereby, on being released by the nippers, the blank will be driven therefrom, substantially as described.

AMERICAN SCREW CO.,
EDWIN G. ANGELL, *Prest.*

Witnesses:
IRVING CHAMPLIN,
ORRIN L. BOSWORTH.